US006911618B1

(12) United States Patent
Chiwata

(10) Patent No.: US 6,911,618 B1
(45) Date of Patent: Jun. 28, 2005

(54) METHOD OF PRODUCING MINUTE METAL BALLS

(75) Inventor: Nobuhiko Chiwata, Yasugi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 10/769,915

(22) Filed: Feb. 3, 2004

(51) Int. Cl.$^7$ ............................................... B23K 10/00
(52) U.S. Cl. ............................ 219/121.38; 219/121.37; 219/121.59; 75/342
(58) Field of Search ..................... 219/121.38, 121.37, 219/121.59, 121.43, 121.48, 121.36; 75/346, 342; 425/6; 205/128

(56) References Cited

U.S. PATENT DOCUMENTS

| 5,601,740 A | * | 2/1997 | Eldridge et al. ......... 219/130.4 |
| 5,707,419 A | * | 1/1998 | Tsantrizos et al. ............ 75/336 |
| 5,761,779 A | * | 6/1998 | Maruyama et al. ........... 28/899 |
| 2004/0062826 A1 | * | 4/2004 | Shibasaki ...................... 425/6 |

FOREIGN PATENT DOCUMENTS

| EP | 0457920 | 11/1991 |
| JP | 4-066601 | 3/1992 |
| JP | 8-294905 | 11/1996 |
| JP | 2002-226803 | 8/2002 |

OTHER PUBLICATIONS

Semicon–Japan 2003 (12/3/5) Presentation Panael.

* cited by examiner

Primary Examiner—Mark Paschall
(74) Attorney, Agent, or Firm—Sughrue Mion, PLLC

(57) ABSTRACT

An object of the present invention is to provide a producing method by which minute metal balls having a high sphericity or roundness and a uniform diameter.

The present invention provides a method of producing minute metal balls, comprising the steps of cutting a wire material having a diameter $\phi$ at predetermined distances to provide metal pieces having a cut length L equal to or smaller than 2 mm and a ratio L/$\phi$ in a range of $0.1 \leq L/\phi \leq 3.0$, and introducing the metal pieces into a plasma flame to spheroidize the metal pieces.

In the present invention, it is preferable that the metal pieces are made of any metal selected from the group consisting of Cu, Ag, Au and Al, or an alloy as a main of any of these metals. It is also preferable that the metal pieces are made of any metal selected from the group consisting of Fe, Ti, W, Ni and Cr, or an alloy as a main of any of these metals.

In addition, it is preferable that the metal pieces are introduced into the plasma flame forming a reducing atmosphere; that 1 to 20% by mass of a hydrogen gas is contained in a plasma operating gas for generating the plasma flame; and that RF plasma is used as the plasma flame.

8 Claims, 2 Drawing Sheets

100 μm

200 μm

100 μm

METHOD OF PRODUCING MINUTE METAL BALLS

BACKGROUND OF THE INVENTION

1. Field of the Invention

The present invention relates to a method of producing minute metal balls having a high sphricity or roundness and a uniform diameter.

2. Description of the Related Art

Recently, minute metal balls having a high syphricity or roundness and a uniform diameter are required in a variety of fields. For example, in a field of producing electronic equipments, bonding methods called Ball Grid Array (BGA) and Chip Size Package (CSP) are carried out widely, and in these bonding methods, minute metal balls are employed. Any of the BGA and CSP is a technique in which an IC package including inputting and outputting pads arranged on a back thereof and metal balls previously mounted therein is placed on a packaging board, and the package and the packaging board are bonded by an entirely reflow.

In accordance with an increase of performance in the electronic equipment, a high-accuracy bonding size is required for bonding parts constituted the electronic equipment by the BGA, CSP or the like. Conventionally, the required bonding size indicates dimensions in longitudinal, transverse and planar directions, but in electronic parts used in certain electronic equipments, a high-accuracy bonding dimension in a height-wise direction, i.e., regarding a distance between a part and a board to which the part is bonded is also required in addition to the dimension in a planar direction. In other words, in such an electronic equipment, a junction is required not only to merely function as an electric conductive area, but also to function as a spacer.

In the connection by BGA or CSP, minute metal balls made of a Sn-based soldering alloy having a low melting point are usually employed, but in the above-described application in which the function as the spacer is required, minute metal balls made of Cu or the like having a melting point higher than a soldering alloy and coated with a soldering alloy are employed.

In the minute metal balls employed in these applications illustrated, a smaller diameter, a higher sphricity or roundness and a smaller dispersion of diameters are required altogether. Currently, such minute metal balls are produced by an oil cooling process comprising the steps of throwing small metal pieces cut at a regular size, from above, into an oil having a temperature at its upper portion higher than a melting point of the small metal pieces and a temperature at its lower portion lower than melting point of the small metal pieces, and spheroidizing the small metal pieces by utilizing a surface tension, or a process comprising the steps of heating small metal pieces to a temperature equal to or higher than its melting point, while dropping the small metal pieces freely, and spheroidizing the small metal pieces (for example, see JP-A-04-066601 and JP-A-08-295905).

SUMMARY OF THE INVENTION

In the above-described processes, the metal pieces cut at a regular volume, are molten and spheroidized by the surface tension and then solidified. Therefore, it is possible to produce minute metal balls having a high sphericity or roundness and a uniform diameter.

In the oil cooling process, however, only a low-melting point metal such as a soldering metal and the like, namely, only a metal having a melting point equal to or lower than that of an oil can be utilized and hence, it is impossible to spheroidize a higher-melting point metal such as Cu, W, Mo and the like.

In the processes described in JP-A-04-066601 and JP-A-08-295905, it is impossible to heat the metal pieces to a high temperature, as compared with the oil cooling process, but the metal pieces are dropped freely in a furnace. Therefore, the metal pieces are passed through a higher-temperature area in the furnace in a short time and for this reason, they cannot be heated sufficiently in some cases. In a case of very small-sized metal pieces, the scattering of the metal pieces and the deposition of the metal pieces to the interior of the furnace are unavoidable because of the convection of the metal pieces within a furnace core. This causes problems that the life of the furnace is shortened, and a powder cannot be recovered. Further, when high-melting point metal pieces are spheroidized, the temperature of the furnace cannot be raised up to a sufficient temperature, as compared with the melting point of the metal pieces and for this reason, the heating of the metal pieces is insufficient, and it is difficult to achieve the spheroidization.

Accordingly, it is an object of the present invention to provide a producing method by which minute metal balls having a high sphericity or roundness and a uniform diameter can be produced easily.

The present inventors have solved the above-described problems by heating and shaping metal pieces made by cutting a wire material at a predetermined size by plasma.

More specifically, according to the present invention, there is provided a method of producing minute metal balls, comprising the steps of cutting a wire material having a diameter $\phi$ at predetermined distances to provide metal pieces having a cut length L equal to or smaller than 2 mm and a ratio $L/\phi$ in a range of $0.1 < L/\phi \leq 3.0$, and introducing the metal pieces into a plasma flame to spheroidize the metal pieces.

According to the present invention, there is also provided a method of producing minute metal balls, comprising the steps of cutting a wire material having a diameter $\phi$ at predetermined distances to provide metal pieces having a cut length L equal to or smaller than 2 mm, a ratio $L/\phi$ in a range of $0.1 \leq L/\phi \leq 3.0$ and an average volume equal to or smaller than $5 \times 10^{-4}$ cm$^3$, and introducing the metal pieces into a plasma flame to spheroidize the metal pieces.

According to the present invention, there is further provided a method of producing minute metal balls, comprising the steps of cutting a wire material having a diameter $\phi$ at predetermined distances to provide metal pieces having a cut length L equal to or smaller than 2 mm, a ratio $L/\phi$ in a range of $0.1 \leq L/\phi \leq 3.0$, an average volume equal to or smaller than $5 \times 10^{-4}$ cm$^3$, and a CV value of volumes equal to or smaller than 5% calculated according to the following equation:

$$CV \text{ value} = \sigma_v / V_{ave} \times 100 (\%),$$

wherein $V_{ave}$ is an average volume of the metal pieces, and $\sigma_v$ is a standard deviation in a distribution of volumes of the metal pieces; and introducing the metal pieces into a plasma flame to spheroidize the metal pieces.

According to the present invention, it is preferable that the metal pieces are made of any metal selected from Cu, Ag, Au and Al, or an alloy as a main of any of these metals. It is also preferable that the metal pieces are made of any metal selected from Fe, Ti, W, Ni and Cr, or an alloy as a main of any of these metals.

In addition, according to the present invention, preferably, the metal pieces are introduced into the plasma flame forming a reducing atmosphere, or 1 to 20% by volume of a hydrogen gas is contained in a plasma operating gas for generating the plasma flame. It is also preferable that RF plasma is used as the plasma flame.

According to the present invention, it is possible to produce minute metal balls having a high sphericity or roundness and a uniform diameter. In addition, it is possible to simultaneously achieve the cleaning of surfaces of the minute metal balls. The minute metal balls having such features are indispensable to the production of an electronic part, a micro-machine and the like.

The above and other objects, features and advantages of the invention will become apparent from the following description of the embodiments taken in conjunction with the accompanying drawings.

DETAILED DESCRIPTION OF THE PREFERRED EMBODIMENTS

Figure 1A:
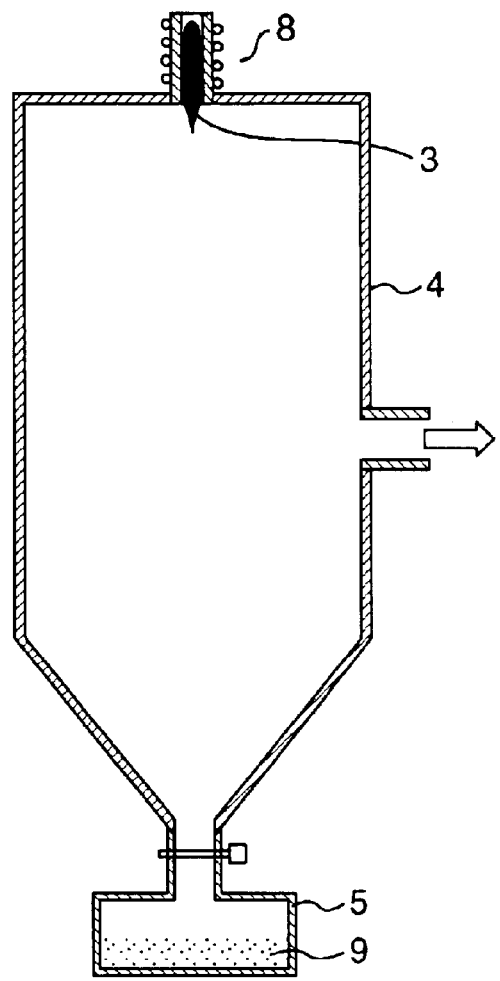
FIG. 1 is a diagrammatic illustration showing one example of an apparatus for carrying out a producing method according to the present invention.

As described above, the important feature of the present invention resides in the employment of an arrangement in which metal pieces made by cutting a wire material at predetermined distances are introduced into a plasma flame.

The plasma flame utilized in the present invention means an ionized gas in which each of molecules in a gas is dissociated into atoms by applying energy to the gas, and the atoms are further ionized into ions and electrons. Thus, the metal pieces can be heated to a very high temperature, specifically to 5,000° C. in a higher-temperature area of the plasma flame, as compared with a conventional producing method in which the heating of the metal pieces is carried out by an electric furnace. In this way, the plasma flame provides an extremely high temperature atmosphere in which even metal pieces made of a metal or an alloy having a melting point higher than that of a soldering metal in a range of 500 to 2,000° C. or higher are molten in a moment in virtue of a high thermal conductivity of the plasma flame when they are introduced into the higher-temperature area of the plasma flame.

In addition, when the plasma flame is used, an area heated to a higher temperature is only an area where the plasma flame exists, and at a location out of the plasma flame, the temperature is dropped suddenly. In other words, an atmosphere having a locally extremely high temperature can be achieved, and a steep temperature gradient can be achieved between the plasma flame and other places. This steep temperature gradient ensures that the metal pieces can be molten and spheroidized by their own surface tension in the high-temperature area of the plasma area, and when the spheroidized metal pieces are moved out of the plasma flame, they can be cooled quickly to lower than the melting point and solidified to form metal balls. Therefore, the high-melting point metal can be spheroidized effectively in a short time in which it is dropping substantially freely.

In the courses of the melting and the solidification in such plasma flame, metal pieces individually subjected to the melting and solidification are molten and solidified in a short time and hence, an amount of metal pieces evaporated during the melting is smaller, and the volume of the metal pieces is little varied. Therefore, minute metal balls having a uniform diameter can be produced by using the metal pieces formed by cutting the wire material at predetermined distances, i.e., the metal pieces having uniform volumes. There is a conventional producing method in which melting and solidifying courses are not performed for individual metal piece, and one metal piece is brought into contact with another metal piece during melting, resulting in a variation in volume. Metal balls produced in this manner are of largely different volumes and shapes, as compared with those each produced from one metal piece and hence, they can be easily removed by the classification.

In addition, in the producing method according to the present invention, the content of an oxide formed on the metal pieces can be reduced in the melting and spheroidizing courses, thereby producing minute metal balls each having a clean surface, as compared with the conventional producing method. This is because the temperature reaches 5,000° C. or higher in the high-temperature area of the plasma flame in the producing method according to the present invention, as already described, but when the metal pieces are heated to the high temperature such as 5,000° C. in the plasma flame, oxygen forming the oxide on the surface of each metal piece is dissociated and scattered in the atmosphere.

When the minute metal balls are used in an electronic equipment, it is required that the surface of each metal ball is less contaminated and oxidized, by reason of the fact that the resistivity of the minute metal balls is reduced or by another reason. According to the present invention, however, the minute metal balls suitable for such an application can be produced. Therefore, it is particularly preferable that the producing method according to the present invention is utilized for the spheroidization of a metal or an alloy used as a conductive material, specifically, any metal selected from the group consisting of Cu, Ag, Au and Al or an alloy as a main of any of these metals.

Further, metal balls having a lower content of oxygen can be produced by carrying out the melting, spheroidization and solidification of metal pieces in plasma forming a reducing atmosphere.

In contrast with this, when metal balls each having a surface formed of an oxidized film are required, surfaces of metal balls can be oxidized by using an oxygen-introduced plasma flame forming an oxidizing atmosphere.

The producing method according to the present invention is available for producing minute metal balls made of a metal such as Fe, Ti, W, Ni and Cr or an alloy as a main of any of these metals, in addition to the above-described metals and alloys. The minute metal balls made of any of these metals or alloys may be used as an electrode material or a spacer in an electronic equipment and also used as balls for small-sized bearings and as balls for contact probes.

In the present invention, necessary conditions are that the metal piece has a length L equal to smaller than 2 mm, and the wire material before being cut has a length L/diameter φ ratio in a range of $0.1 \leq L/\phi \leq 3.0$.

If the proportion of the length L to the diameter φ is smaller, it is difficult to cut the wire material, but also the proportion of an area of a cut portion in a surface area of a metal piece is larger. The cutting is carried out by a cutter or the like. In this case, a plastic deformation occurs in the cut portion, but the shape is uneven in and around the cut portion. For this reason, if the proportion of an area occupied by the cut portion is larger, the volumes of the metal pieces are uneven. Therefore, the ratio L/φ is set in a range of 0.1≦L/φ in order to decrease the variability of volume in the metal pieces made by the cutting of the wire material.

On the other hand, if the proportion of the length L to the diameter φ is too large, each of the metal pieces is liable to be divided in lengthwise direction into two or more portions during melting in the spheroidization in the plasma flame and as a result, it is difficult to produce minute metal balls having a uniform size. Therefore, the ratio L/φ is set in a range of L/φ≦3.0, preferably in a range of 1.0≦L/φ≦2.0. The melting of the wire pieces made by cutting the wire material at a large length and having a large volume may be insufficient in some cases in a short time in which they are dropping freely. Therefore, the length of the wire pieces made by cutting the wire material is set at 2 mm or less, preferably at 1 mm or less, more preferably at 0.5 mm.

In the producing method according to the present invention, it is preferable that the average volume of the metal pieces is equal to or smaller than $5 \times 10^{-4}$ cm$^3$. As described above, the feature of the present invention is that the metal pieces are molten, spheroidized and solidified in the short time by using the plasma flame. As the size of the metal piece is smaller, the process can be performed in a shorter time, which is preferable. Specifically, it is preferable that the average volume of the metal pieces is equal to or smaller than $5 \times 10^{-4}$ cm$^3$.

According to the present invention, it is preferable that the CV value of the volumes of the metal pieces is equal to or smaller than 5%.

The CV value used herein is a value which represents the uniformity of the volumes of the metal pieces and which is calculated from an average volume $V_{ave}$ and a standard deviation $\sigma_v$ of a distribution of the volumes of the metal pieces according to the following equation:

$$CV \text{ value} = \sigma_v/V_{ave} \times 100(\%)$$

As described above, in the method for producing metal balls according to the present invention, the variation in volume little occurs in the melting and solidifying courses, when the melting and the solidification are carried out for the individual metal pieces. In other words, the melting and solidifying courses are not performed for the individual metal pieces, and the dispersion of metal pieces remaining after the removal of metal balls of largely different volumes and shapes by the classification depends on the dispersion of metal pieces which are still not introduced into the plasma flame.

Therefore, to produce metal balls having a uniform diameter according to the present invention, it is preferable that metal pieces having a uniform volume.

By using metal pieces having a CV value (which represents the uniformity of the volumes of the metal pieces) equal to or smaller than 5%, metal balls having a more uniform diameter can be produced. In addition, the deposition of a fine powder on the surfaces of the metal balls can be reduced, thereby achieving the cleaning of the surfaces. It is preferable that metal pieces having a CV value equal to or smaller than 1%, more preferably equal to or smaller than 0.5% are used.

As described above, with the producing method according to the present invention, a metal piece having a high melting point, which is difficult to spheroidize in the prior art because of its high melting point, can be spheroidized effectively in a state in which the oxidation and contamination of the surface are inhibited. Therefore, minute metal balls of various qualities can be produced by the producing method according to the present invention.

Figure 1B:
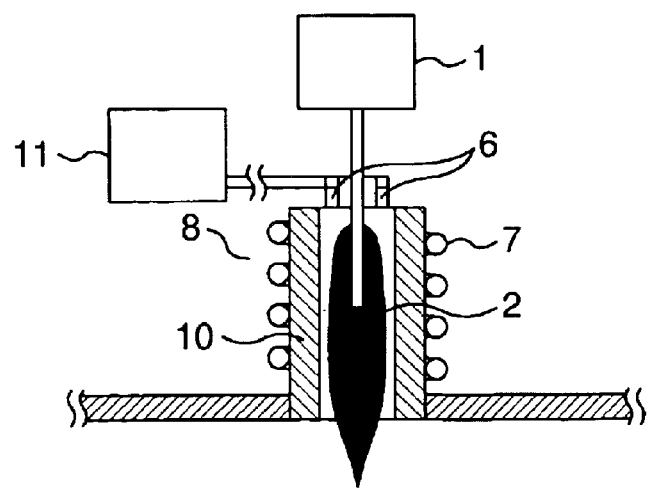

The method for producing the metal balls according to the present invention can be carried out by one example of an apparatus shown in FIG. 1.

Referring to FIG. 1, a RF plasma torch 8 cooled by a water-cooling pipe 10 generates a plasma flame 3 by a plasma operating gas supplied from a plasma working gas feed position by a plasma operating gas feeder 11 and by a high-frequency energy generated from a coil 7.

Metal pieces cut at predetermined size and thrown into a starting-material supply device 1 (e.g., an electromagnetic vibrating starting-material supply device) are thrown along with a carrier gas into a high-temperature area (at 5,000 to 10,000° C.) within the plasma flame 3 by a starting-material feeder 2. The starting material thrown into the plasma flame is molten in a moment and formed into a spherical shape by a surface tension.

The starting material supplied from the starting-material feeder 2 located upstream of the plasma flame is passed in a sufficiently heated and molten state through a plasma area containing hydrogen gas and having a high refining effect, whereby the content of impurities such as an oxide is reduced.

The metal pieces treated within the plasma flame are solidified in an inert gas atmosphere while being dropped, and then collected and recovered as minute metal balls in an underlying minute metal ball recovery section 5 located.

In the above-described manner, minute metal balls having a uniform diameter can be produced effectively.

Typical of the plasma flame which may be utilized in the present invention are DC plasma and RF plasma, but it is preferable that the RF plasma is employed. The reason why the RF plasma is used is that no electrode is required, and the incorporation of impurities due to an electrode material less occurs, unlike a case where the DC plasma is used. In addition, when the DF plasma is used, the flow speed of the plasma operating gas can be decreased as compared with the use of the DC plasma and hence, the metal pieces can be heated sufficiently by prolonging the time of residence of the metal pieces in the plasma flame.

An argon gas, a nitrogen gas or the like commonly used as a plasma operating gas can be used as the plasma operating gas for generating the plasma flame, but it is preferable that a hydrogen gas is contained in the plasma operating gas.

According to the present invention, the concentration of oxygen in the surfaces of the minute metal balls can be reduced by introducing the metal pieces into the plasma flame. However, if hydrogen is introduced into the plasma operating gas, the concentration of oxygen can be further reduced by a reducing reaction of hydrogen ions and excited atoms. When the hydrogen gas is contained in the plasma operating gas, it is preferable that the concentration of the hydrogen gas in the plasma operating gas is set at a value equal to or higher than 1% by volume, more preferably equal to or higher than 3% by volume in order to provide a sufficient effect. It should be noted that the concentration of oxygen can be reduced by increasing the concentration of the hydrogen gas, but if the hydrogen gas is contained in an excessive content in the plasma operating gas, the plasma flame is unstable and thus, the spheroidization of the metal pieces cannot be achieved in some cases. Therefore, it is preferable that the hydrogen gas is contained in the plasma operating gas at a concentration equal to or lower than 20% by volume.

EXAMPLE 1

Minute metal balls having a target diameter of 300.0 μm were fabricated under producing conditions which will be described hereinafter, using the RF plasma apparatus shown in FIG. 1 and using metal pieces each comprising 71% by mass of Ag and the balance substantially of Cu. The Ag—Cu alloy (the metal piece) introduced into the plasma flame was made by cutting a wire having a diameter of 0.2 mm at a given size by a rotary cutter. A CV value of the metal piece is a value calculated from measurements determined by measuring a length and a diameter of the metal piece of about 60 pcs from an image of a side face (a face horizontal to an axis) of each metal piece. A CV value of a metal ball is a value calculated from a measurement determined by measuring a diameter of a minute metal ball of about 60 pcs at any location from an image of the minute metal ball.

(Producing Conditions)

Size of metal piece: $\phi$0.2 mm×L 0.450
(volume: $1.4\times10^{-5}$ cm$^3$ and L/$\phi$=2.25)

CV value of metal piece: 0.47%

Plasma operating gas: Ar 30 L/min, H$_2$ 1 L/min, a mixed gas

Plasma torch: A water-cooling quartz pipe having $\phi$ of 50 mm and a high-frequency induction coil having $\phi$ of 70 mm Chamber: having a maximum inside diameter $\phi$ of 800 mm and a maximum inside height of 1,500 mm Atmosphere in chamber: an Ar gas atmosphere Starting material supply device: An electromagnetic feeder Input conditions for high-frequency induction coil: 4 MHz and 10 kW Metal balls produced under the above-described conditions were subjected to a sieve classification for removing metal balls having largely different diameters and a rolling classification for removing two or more metal balls connected together (a classifying method which comprises rolling metal balls on an inclined flat plate and removing metal balls which are not moved straightly. The metal balls having a total weight of about 30% of the total weight of the metal pieces introduced into the plasma flame were recovered. 100 Balls were selected at random from the metal balls resulting from the classifications, and an average diameter and an average roundness were measured. These metal balls selected were subjected to an image analysis for their SEM images, whereby the average diameter was determined from a diameter (a circle-equivalent diameter) of a projected area supposed to be a circle, and the average roundness was determined according to an equation: roundness=circle-correspondence diameter/maximum diameter. A volume of each of the metal balls was calculated from the circle-equivalent diameter, whereby a CV value of volumes of the metal balls was determined. In addition, the analysis of a content of oxygen in each of the metal balls was carried out by an ICP process. Results are shown in Table 1.

As shown in Table 1, the metal balls each having a target diameter and a high sphericity or roundness could be produced. The metal balls have a CV value of 0.47, which is the same value as a CV value of the metal pieces introduced into the plasma flame. In addition, a content of oxygen having a value as very low as 1 ppm or less which is a detection lime shown by a measuring device could be achieved.

In the producing method according to the present invention, a metal piece having a high melting point as compared with a low-melting point metal such as a soldering alloy or the like can be spheroidized. Metal balls produced by this producing method can be used as metal balls for a conductive spacer for electrically connecting, for example, a printed board and an electronic part to each other and fixing a distance at any value.

In a BGA connection, if the minute metal balls are placed on a peripheral portion of a BGA board and molten and bonded thereto in advance by EB or the like, they are not molten during reflow of the BGA in which usual soldering balls are molten, because they have a melting point higher than that of the usual soldering balls. As a result, a function for preventing the crushing of the metal balls can be provided to the metal balls. Therefore, an enhancement in reliability of the BGA connection by the reflow is provided.

The surfaces of the minute metal balls produced by the producing method according to the present invention may be coated with a low-melting point metal such as soldering material or plated with an Au plating material.

TABLE 1

| | |
|---|---|
| Target diameter | 300.0 µm |
| Average diameter | 300.5 µm |
| Average roundness | 0.9929 |
| CV value of minute metal balls | 0.47% |
| Analysis value of O$_2$ | 1 ppm or less |

EXAMPLE 2

Metal balls having a target diameter of 300.0 µm were produced using the RF plasma apparatus shown in FIG. 1 and using metal pieces each substantially consisting of Cu (containing inevitable impurities) under producing conditions shown hereinafter. In this case, the production was carried out using two types of metal pieces having different CV values. The production of the metal pieces and the measurement of CV values were carried out in the same manner as in Example 1.

(Producing Conditions)

Size of metal piece: $\phi$0.2 mm×L 0.450 mm (volume 1.4×10–5 cm3 and L/$\phi$=2.25)

Plasma operating gas: Ar 30 L/min

Plasma torch; A water-cooling quartz pipe having $\phi$ of 50 mm and a high-frequency induction coil having $\phi$ of 70 mm Chamber: having a maximum inside diameter $\phi$ of 800 mm and a maximum inside height of 1,500 mm Atmosphere in chamber: an Ar gas atmosphere Starting material supply device: An electromagnetic feeder Input conditions for high-frequency induction coil: 4 MHz and 12 kW Metal balls produced under the above-described conditions were subjected to classifications similar to those in Example 1, whereby the metal balls having a total weight of about 40% of the total weight of the metal pieces introduced into the plasma flame were recovered. About 60 balls were selected at random from the metal balls resulting from the classifications, and an average diameter and a CV value of the metal balls and a content of oxygen in each of the metal balls were measured in a method similar to that in Example 1. Results are shown in Table 2.

TABLE 2

| | CV value of metal pieces | |
|---|---|---|
| | 0.47% | 0.55% |
| Average diameter | 300.3 µm | 300.4 µm |
| CV value of minute metal balls | 0.47% | 0.55% |
| Analysis value of O$_2$ | 1 ppm or less | 1 ppm or less |

As shown in Table 2, the CV value of the metal pieces introduced into the plasma flame is equal to the CV value of the metal balls resulting from the calcifications. Therefore, it is possible to decrease the dispersion of the diameters of the metal balls resulting from the classifications by decreasing the dispersion of the metal pieces.

EXAMPLE 3

Metal balls having a target diameter of 100.0 μm were produced using the RF plasma apparatus shown in FIG. 1 and using metal pieces made substantially of an austenitic stainless steel (Fe-19.45Cr-9.77Ni.0.1C(by mass) (JIS SUS304) under producing conditions shown hereinafter. In this case, the production of the metal pieces and the measurement of the CV value were carried out in the same manner as in Example 1. The measurement of the composition of the metal pieces was carried out in an LECO process.

(Producing Conditions)
Size of metal piece: $\phi$ 0.2 mm×L 0.135 mm (volume $4.1 \times 10^{-6}$ cm$^3$ and L/$\phi$=0.675)
CV value of metal pieces: 1.57%
Plasma operating gas: Ar 30 L/min
Plasma torch: A water-cooling quartz pipe having $\phi$ of 50 mm and a high-frequency induction coil having $\phi$ of 70 mm
Chamber: having a maximum inside diameter $\phi$ of 800 mm and a maximum inside height of 1,500 mm
Atmosphere in chamber: an Ar gas atmosphere
Starting material supply device: An electromagnetic feeder
Input conditions for high-frequency induction coil: 4 MHz and 10 kW Metal balls produced under the above-described conditions were subjected to classifications similar to those in Example 1, whereby the metal balls having a total weight of about 98% of the total weight of the metal pieces introduced into the plasma flame were recovered. About 60 balls were selected at random from the metal balls resulting from the classifications, and an average diameter and a CV value of the metal balls were measured in a method similar to that in Example 1. Results are shown in Table 3.

TABLE 3

| Target diameter | 100.0 μm |
|---|---|
| Average diameter | 98.6 μm |
| CV value of minute metal balls | 1.58% |
| Composition of metal balls (mass %), | Fe-19.45Cr-9.77Ni-0.1C. |

As shown in Table 3, the metal balls having a target diameter and a high sphericity or roundness could be produced. The CV value of the metal balls is 1.58%, which is equal to the CV value of the metal pieces introduced into the plasma flame. In addition, as a result of the analysis of the composition of the metal balls, no variation in composition from that of the metal pieces was confirmed.

EXAMPLE 4

Metal balls having a target diameter of 300.0 μm were produced using the RF plasma apparatus shown in FIG. 1 and using metal pieces substantially consisting of Al (containing inevitable impurities) and having a CV value of 0.70% under producing conditions shown hereinafter. In this case, the production of the metal pieces and the measurement of the CV value were carried out in the same manner as in Example 1.

(Producing Conditions)
Size of metal piece: $\phi$ 0.3 mm×L 0.200 mm (volume $1.4 \times 10^{-5}$ cm$^3$ and L/$\phi$=0.667)
Plasma operating gas: Ar 30 L/min
Plasma torch: A water-cooling quartz pipe having $\phi$ of 50 mm and a high-frequency induction coil having $\phi$ of 70 mm
Chamber: having a maximum inside diameter $\phi$ of 800 mm and a maximum inside height of 1,500 mm
Atmosphere in chamber: an Ar gas atmosphere
Starting material supply device: An electromagnetic feeder
Input conditions for high-frequency induction coil: 4 MHz and 19 kW Metal balls produced under the above-described conditions were subjected to classifications similar to those in Example 1, whereby the metal balls having a total weight of about 97% of the total weight of the metal pieces introduced into the plasma flame were recovered. About 60 balls were selected at random from the metal balls resulting from the classifications, and an average diameter and a CV value of the metal balls were measured in a method similar to that in Example 1. Results are shown in Table 4. Scanned photomicrographs showing a surface and a section of each of the produced metal balls are shown in FIGS. 2 and 3, respectively.

TABLE 4

| Target diameter | 300.0 μm |
|---|---|
| Average diameter | 301.4 μm |
| Average roundness | 0.99 |
| CV value of minute metal ball | 0.70% |

Figure 2:
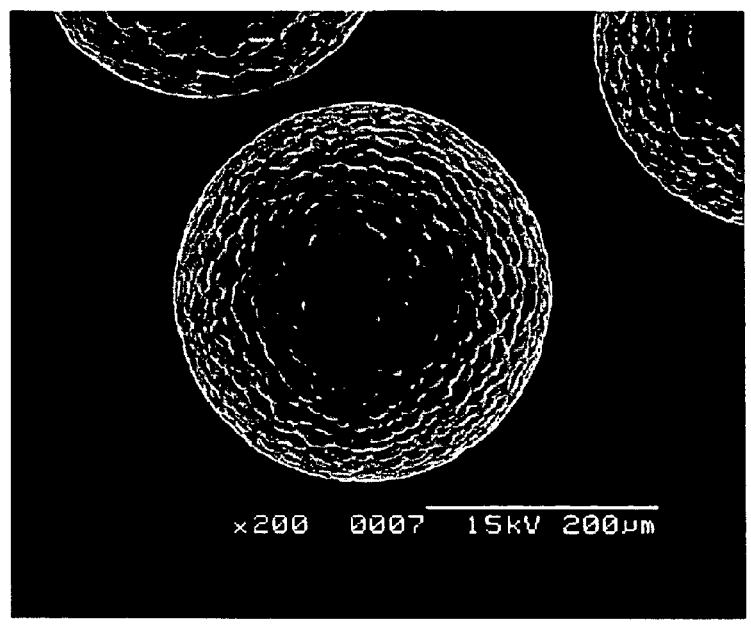
FIG. 2 is a scanning electron photomicrograph showing a surface of each of Al metal balls produced by the producing method according to the present invention.
Figure 3:
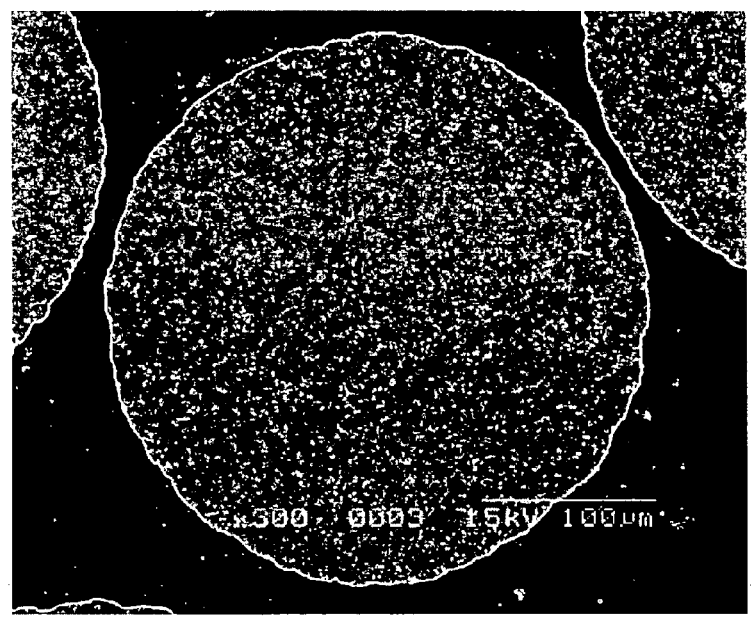
FIG. 3 is a scanning electron photomicrograph showing a section of each of the Al metal balls produced by the producing method according to the present invention.

As shown in Table 4 and FIG. 2, the metal balls each having a high sphericity or roundness was produced. The CV value of the metal balls resulting from the classifications is equal to the CV value of the metal pieces introduced into the plasma flame. Therefore, it is possible to decrease the dispersion of the diameters of the metal balls resulting from the classifications by decreasing the dispersion of the metal pieces.

As shown in FIG. 3, the metal balls each having no voids therein could be produced according to the present invention. Therefore, even when the metal balls are used in molten states, as described in Example 1, a variation in volume of each of the metal balls cannot occur before and after the melting and thus, the metal balls are also suitable for an application for the BGA connection requiring the fact that the heights of members to be connected to each other are controlled precisely.

Although the embodiments of the present invention have been described in detail, it will be understood that the present invention is not limited to the above-described embodiments, and various modifications and corrections may be made without departing from the spirit and scope of the invention defined in accompanying claims.

What is claimed is:

1. A method of producing minute metal balls, comprising the steps of cutting a wire material having a diameter $\phi$ at predetermined distances to provide metal pieces having a cut length L equal to or smaller than 2 mm and a ratio L/$\phi$ in a range of $0.1 \leq L/\phi \leq 3.0$, and introducing the metal pieces into a plasma flame to spheroidize the metal pieces.

2. A method of producing minute metal balls, comprising the steps of cutting a wire material having a diameter $\phi$ at predetermined distances to provide metal pieces having a cut length L equal to or smaller than 2 mm, a ratio L/$\phi$ in a range of $0.1 \leq L/\phi \leq 3.0$ and an average volume equal to or smaller than $5 \times 10^{-4}$ cm$^3$, and introducing the metal pieces into a plasma flame to spheroidize the metal pieces.

3. A method of producing minute metal balls, comprising the steps of cutting a wire material having a diameter $\phi$ at predetermined distances to provide metal pieces having a cut length L equal to or smaller than 2 mm, a ratio $L/\phi$ in a range of $0.1 \leq L/\phi \leq 3.0$, an average volume equal to or smaller than $5 \times 10^{-4}$ cm$^3$, and a CV value of volumes equal to or smaller than 5% calculated according to the following equation:

$$CV \text{ value} = \sigma_v/V_{ave} \times 100(\%),$$

wherein $V_{ave}$ is an average volume of the metal pieces, and $\sigma_v$ is a standard deviation in a distribution of volumes of the metal pieces; and introducing the metal pieces into a plasma flame to spheroidize the metal pieces.

4. A method of producing minute metal balls according to any of claims 1 to 3, wherein the metal pieces are made of any metal selected from the group consisting of Cu, Ag, Au and Al, or an alloy as a main of any of these metals.

5. A method of producing minute metal balls according to any of claims 1 to 3, wherein the metal pieces are made of any metal selected from the group consisting of Fe, Ti, W, Ni and Cr, or an alloy as a main of any of these metals.

6. A method of producing minute metal balls according to any of claims 1 to 3, wherein the metal pieces are introduced into the plasma flame forming a reducing atmosphere.

7. A method of producing minute metal balls according to any of claims 1 to 3, wherein 1 to 20% by volume of a hydrogen gas is contained in a plasma operating gas for generating the plasma, flame.

8. A method of producing minute metal balls according to any of claims 1 to 3, wherein RF plasma is used as the plasma flame.

* * * * *